United States Patent [19]

Rosaz et al.

[11] Patent Number: 4,574,641
[45] Date of Patent: Mar. 11, 1986

[54] APPARATUS FOR MEASURING FLUID PRESSURE

[75] Inventors: Guy Rosaz; Guy Maire; Jean-Marie Badoz, all of Pontarlier, France

[73] Assignee: Schrader S.A., Pontarlier, France

[21] Appl. No.: 510,438

[22] Filed: Jul. 1, 1983

[30] Foreign Application Priority Data

Jul. 5, 1982 [FR] France .............................. 82 11968

[51] Int. Cl.$^4$ .............................................. G01L 9/04
[52] U.S. Cl. ..................................... 73/726; 137/228; 137/557
[58] Field of Search ...................... 73/146.5, 726, 723, 73/754; 137/228, 229, 557

[56] References Cited

U.S. PATENT DOCUMENTS 3,370,459 2/1968 Cescati ............................ 73/146.5

FOREIGN PATENT DOCUMENTS 2408825 6/1979 France .

Primary Examiner—Donald O. Woodiel
Attorney, Agent, or Firm—Sandler & Greenblum

[57] ABSTRACT

An apparatus for measuring fluid pressure has an electrical circuit for measuring fluid pressure which is closed only when simultaneously, the pressure to be measured is at least equal to a predetermined threshold and is substantially stable. A deformable member deforms under application of pressure of the fluid being measured and closes the electrical circuit. When fluid is moving through the apparatus, a Venturi valve member functions to lower the pressure of the fluid in contact with the deformable gauge member to reopen the electrical circuit. The Venturi valve member is formed by a revolution cone disposed in a chamber such that the passageway located annularly around the cone is reduced. A measuring apparatus integral with a deflating-inflating assembly is also provided.

30 Claims, 5 Drawing Figures

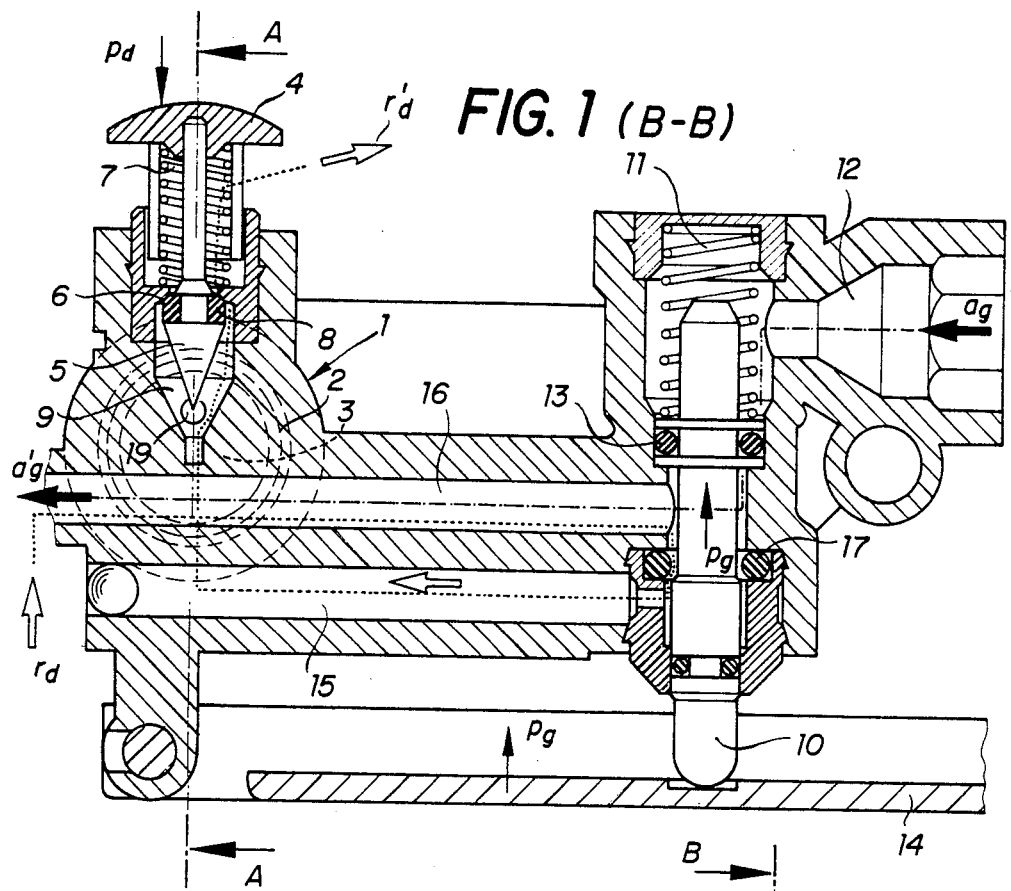
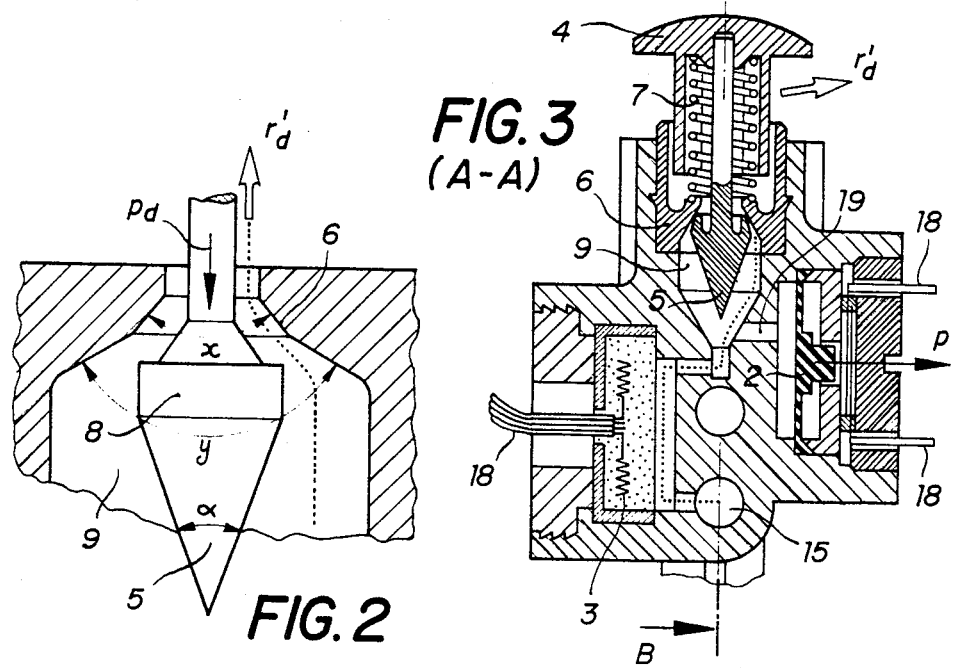

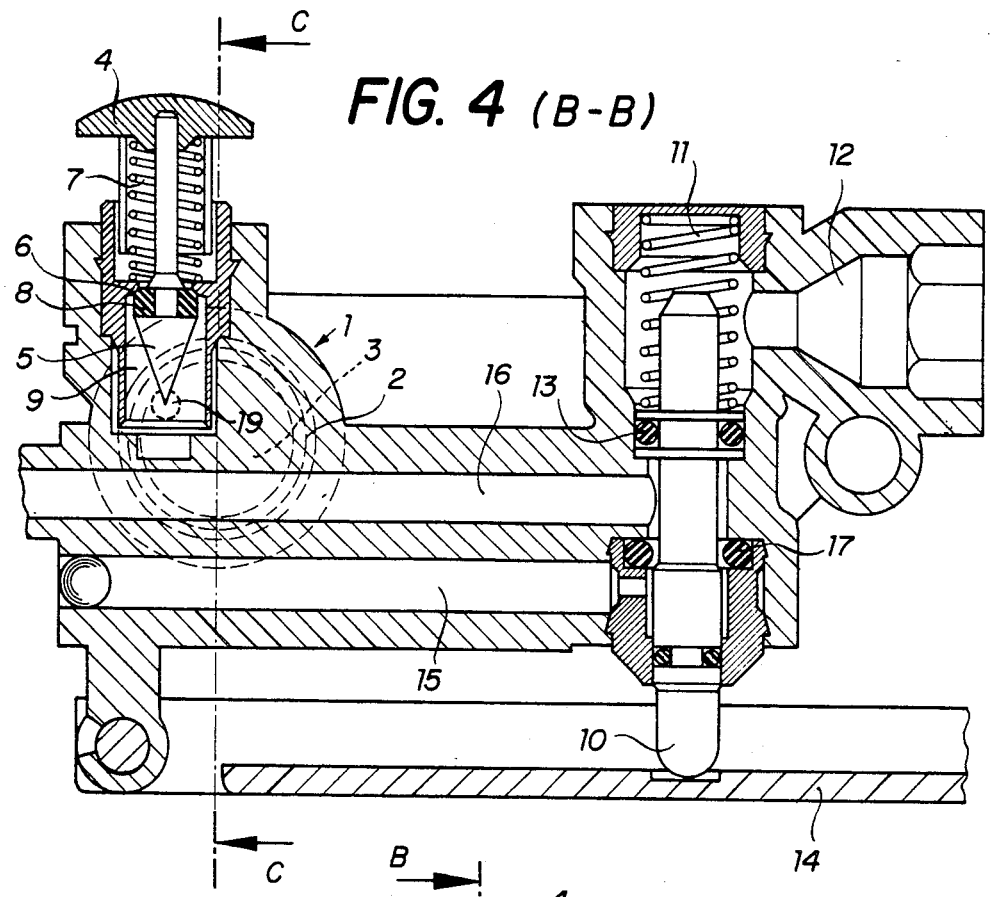
FIG. 4 (B-B)
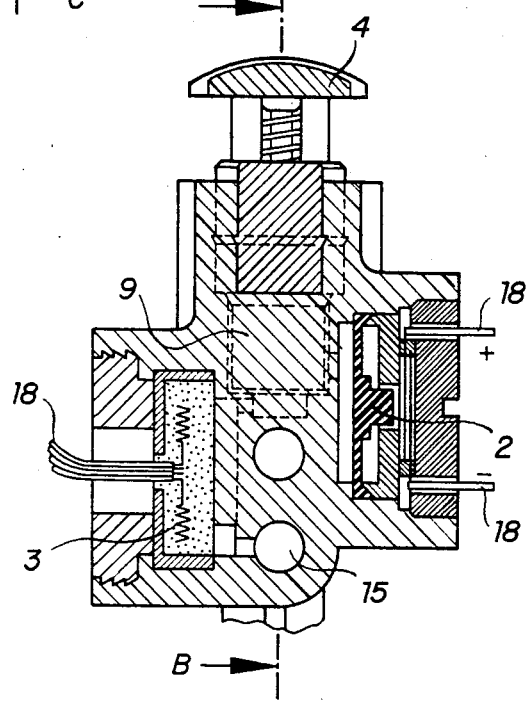
FIG. 5 (C-C)

APPARATUS FOR MEASURING FLUID PRESSURE

FIELD OF THE INVENTION

The present invention relates to a purely mechanical apparatus providing for the automatic closing of an electrical circuit for measuring fluid pressure, particularly of air. The invention also relates to an inflating and/or deflating assembly for pneumatic devices using this apparatus.

BACKGROUND OF THE INVENTION

In pressure reading devices, it is desirable to disengage the pressure indicator when the apparatus inflates or deflates a tire or other pneumatic device. In effect, during inflation or deflation, the parameter being measured is the sum of the static pressure and the dynamic pressure; of course, this sum is inherently different from the static pressure which alone interests the user. Only the static pressure reflects in effect the pressure which is present in the pneumatic device.

In apparatus with electrical measurement means, interrupters or commutators are sometimes provided to disengage the indicator when the inflating or deflating element is activated. However, experience shows that it is difficult in such systems to effect automatic cut-off of the indicator.

Some systems operate to disengage not the indicator directly, but the measurement element itself, again using commutators or interrupters which are designed to be as automatic as possible. Thus, when neither the inflating or deflating elements are activated, the electrical circuit for measuring the fluid pressure will be functioning. As a result, in such systems, this circuit operates substantially continuously, except during brief inflating and deflating operations. This results in excessive electric power consumption as well as frequent battery changes. Furthermore, to cut the circuit when the inflater is not in use would necessitate the use of a separate commutator, thus tending to negate the simplicity of the system.

Some systems provide for setting the pressure gauge at surrounding atmospheric pressure when the apparatus is activated. This is easily achievable when inflating because there is a great difference in the pressure between the system being measured and the atmosphere at the end of the inflating process. However, this leads to efforts which are too great and not very practical when deflating because such pressure difference is usually not great enough.

The present invention eliminates the above-described shortcomings by the purely mechanical apparatus as described below.

SUMMARY OF THE INVENTION

According to the present invention, an apparatus is provided for measuring the pressure of a fluid. Such apparatus includes an electrical circuit for measuring the pressure of the fluid and means for closing the electrical circuit when the pressure of the fluid to be measured simultaneously is at least as great as a predetermined threshold pressure and is stable. The means for closing can be a deformable gauge member in contact with the fluid whose pressure is to be measured. The deformable gauge member closes the electrical circuit when the pressure of the fluid is at least as great as the predetermined threshold pressure. The apparatus can also include means for lowering the pressure of the fluid in contact with the deformable gauge member below the predetermined threshold pressure when the fluid is moving.

The apparatus of the present invention provides for automatic closing of an electrical circuit for measuring fluid pressure. Such closure occurs only when, simultaneously, the pressure to be measured attains a predetermined threshold and is substantially stable. In other words, the electrical circuit is closed or enabled to measure the fluid pressure when those two conditions are met. Such apparatus has a deformable gauge member to which the fluid whose pressure is to be measured is applied. Deformation of this member results in the closing of the electrical circuit. The apparatus also has means for lowering the pressure of the fluid in contact with the deformable gauge member when fluid is moving through the apparatus. The deformable gauge member can be a deformable membrane.

The invention also provides for an apparatus which has an inflating element and a deflating element which employ a single electrical circuit-cutting membrane which interrupts the electrical circuit both when the apparatus itself is not in use as well as when inflating or deflating is being performed.

Conversely stated, the apparatus of the present invention provides for automatic opening of the electrical circuit for measuring pressure when the pressure drops below a predetermined threshold or when it undergoes variations.

The closing of the electric circuit enables measurement of and indicating of the fluid pressure, while opening of the electrical circuit disengages the measurement means and, of course, the indicator means also.

The above-described apparatus can be applied to inflating and/or deflating elements, particularly those adapted for use with tires.

Electrical measurement of fluid pressure is generally done by means of a bridge sensor. The deformable gauge is preferably of the blister-interrupter type which includes, for example, a rubber membrane which deforms under pressure. Preferably, the gauge is adapted so that the electrical circuit closes only when the fluid pressure in contact with the gauge member is greater than 0.2 through 0.3 bar relative to the ambient pressure, this for absolute pressure measurements reaching 14 bars.

The means for lowering the pressure of the fluid which contacts the gauge can be a Venturi device. As is known, a Venturi accelerates the speed of the gas which crosses it, with a corresponding lowering of the gas pressure.

To provide means for lowering the pressure of the fluid in contact with the gauge, it is possible, based on the above-described Venturi principle, to reduce the area of the gas passage, for example, by axially positioning a revolution cone in the passage. Thus, a reduced passage area is obtained which is annularly located around the cone. The cone can also function as a valve to allow the air to escape.

The apparatus according to the present invention can be used with air or any other gas, for example nitrogen, oxygen, hydrogen, carbon dioxide, etc. The means for lowering the pressure must be constructed with materials which are compatible with these gasses.

The apparatus of the present invention can be easily made to be integral with an inflating and/or deflating assembly. Such integral apparatus is preferred, and is in particularly adapted for use with tires. Such apparatus both measures the fluid pressure and deflates the pneumatic device, while inflating is performed by a separate element.

According to the present invention, the electrical circuit for measuring the fluid pressure is automatically opened when the inflating element is activated.

In such an assembly, the electric circuit is, for example, automatically opened simply by setting the gauge at the surrounding atmospheric pressure.

BRIEF DESCRIPTION OF THE FIGURES

The present invention will be more fully understood by those of ordinary skill in the art to which this invention pertains from the following detailed description when considered in connection with the accompanying drawings in which like reference characters designate like or corresponding parts throughout the several views and wherein:

FIG. 1 is a longitudinal cross-sectional view of an inflating-deflating assembly according to a first embodiment of the present invention with the valve member shown in a closed position;

FIG. 2 is a detailed view of a revolution cone according to the present invention, which both lowers the pressure and functions as a valve, showing also the associated valve seat, with the valve member being shown in the open position;

FIG. 3 is a transverse cross-sectional view of the apparatus according to the present invention according to a second embodiment thereof;

FIG. 4 is an analogous view to that of FIG. 1 in an alternative embodiment showing a fluid pressure measurement apparatus according to the present invention integral with an inflating element; and FIG. 5 is a transverse cross-sectional view of the apparatus of FIG. 4 along a section of the gauge member of the measuring circuit.

DETAILED DESCRIPTION OF THE INVENTION

FIG. 1 represents, on the left, an apparatus 1 according to the invention which includes a gauge 2 and a sensor 3, each centered with respect to deflating button 4 and located respectively behind and in front of the plane of the sheet of paper as illustrated in FIG. 3. Deflating button 4 is integral with valve 5, which is preferably cone-shaped and which rests on a seat 6. Deflating spring 7 is disposed between deflating button 4 and valve 5. Valve 5 is located in chamber 9 and has a seal 8 to provide a fluid-tight engagement with valve seat 6. Chambe 9 is in communication with gauge 2 via conduit 19.

On the right of this same FIG. 1, there is disposed an inflating element 25 having an inflating valve 10 and an inflating return spring 11. The pressure feeding is done via conduit 12 and is interrupted by seal 13 when inflating valve 10 is not activated. To more easily overcome resistance resulting from the pressure of bias spring 11, inflating valve 10 is activated by a small bar 14 attached in rotation to the left of FIG. 1 and functioning as a lever against valve 10. In other words, lever bar 14 enables valve 10 to be pushed upwardly using less force than if force were applied directly to valve 10.

The inflating and deflating elements are connected respectively by conduits 15 and 16. Seal 17 operates such that fluid communication between conduits 15 and 16 is open when inflating valve 10 is not activated.

The inflating-deflating assembly functions as described below; the inflating circuit fluid path is represented by alternating dots and dashes, while the deflating circuit fluid path is represented by dotted lines.

The assembly is, for example, connected to a pressure feeding line as shown in FIG. 1. Air is thus admitted into conduit 12 in the direction of arrow $a_g$.

By pushing on bar 14 in the direction of arrow $p_g$, inflating valve 10 is moved and, as a consequence, seal 13 also is moved, always in the direction of $p_g$. The movement of seal 13 places feeding conduit 12 in communication with conduit 16 and air is admitted, e.g., into the tire to be inflated in the direction of arrow $a'_g$.

By releasing the pressure on bar 14, inflating valve 10 returns to its initial position by means of a bias applied by spring 11. At the same time, seal 13 obstructs communication between conduits 12 and 16, while seal 17 places conduits 15 and 16 into fluidic communication. During upward movement of inflating valve 10, seal 17 obstructs communication between conduits 15 and 16.

The condition in which neither inflating valve 10 nor deflating button 4 are activated is represented in FIG. 1. In this condition, the air in the tire is in communication with pressure gauge 2 and sensor 3. The membrane of gauge 2 is deformed by the pressure which is present in the tire. When this deformation reaches a certain magnitude, the membrane comes to rest on electric circuit 18 and closes this circuit, while sensor 3 measures the fluid pressure and indicates it on an appropriate apparatus, not represented in the FIGS. As shown in FIG. 3, the projecting portion of gauge 2 will be pushed toward wire elements 21 and 23 when the membrane is deformed; when the fluid pressure against the membrane reaches a certain magnitude, wires 21 and 23 will touch, thus closing electrical circuit 18.

In order to deflate the tire or other pneumatic device, deflating button 4 is pushed downwardly against the bias of return spring 7; this displaces valve 5, along with its seal 8, out of seat 6 and places chamber 9 in fluidic communication with the surrounding air. Thus, an air circuit is established from the tire to the outside atmosphere as represented by dotted lines beginning along arrow $r_d$ and exiting along arrow $r'_d$. Seal 13 prevents air from returning through feeding conduit 12.

The exiting air accelerates upon contact with conevalve 5, which greatly reduces the area of the free air in comparison with the diameter of conduits 15 and 16, thus creating a depression, i.e., an area of substantially reduced pressure. As a result, the pressure prevailing against gauge 2 and sensor 3 is lowered such that it falls below the adjustment threshold, and gauge 2 returns to its nondeformed position. This interrupts electric circuit 18 by causing wires 21 and 23 to separate, and the pressure indicating apparatus no longer registers a measurement.

FIG. 2 illustrates a detailed view of cone-valve 5 located in chamber 9. Valve 5 rests against seat 6 by means of seal 8. Valve 5 is shown in FIG. 2 in the open position, with the air flow during deflating being represented by arrows in dotted lines ending with the symbol $r_d$. Reference symbol $\alpha$ represents the conical angle of valves and symbols x and y represent the slope angles indicating the geometrical shape of seat 6. Preferably, $\alpha$ is between 40° and 60°. X is approximately in the range of 40° to 75°, preferably about 60°, to more easily create air-tight engagement with valve 5 and, at the same time, to increase the air passage during deflating. Y is approximately in the range of 100° to 140°, preferably about 120°, to allow a large amount of air passage with a small displacement, i.e, with a small magnitude of displacement of the valve-rod-button combination 5,27, 4. This displacement is preferably approximately 20 to 100% of the opening 30 diameter for passing escaping air, including rod 27 which connects deflating button 4 to valve 5.

For a value of less than 7 bars, the escaping air flow is approximately 3.5 to 4 m³/h.

All of the above parameters are interdependent. The forms and dimensions of valve 5 and seat 6 are such as to provide tight connection therebetween; the fluid flows are conditioned by the above-mentioned factors as well as by the diameters of conduits 15, 16 and 19 especially, and the free spaces left by the various seals. Of course, to provide optimal functioning of the apparatus, a flow which is as close to laminar as possible is desirable in order to minimize the voltage drop and also avoid turbulences below valve 5 in chamber 9.

FIG. 3 is a cross-sectional view along section A—A of the apparatus shown in FIG. 1. In FIG. 3, cone-valve 5 is represented in an alternative embodiment. As in FIG. 1, apparatus 1 includes gauge 2 and sensor 3, as well as electrical circuit 18, which cooperate with the indicator (not shown). Section B—B in FIG. 3 represents the view illustrated in FIG. 1.

In the FIG. 3 embodiment, unlike the FIG. 1 embodiment, valve 5 does not include a seal. Instead, air-tight engagement with valve seat 6 is provided by deformation of valve 5. Cone-valve 5 is made, for example, of plastic material having a low coefficient of friction (e.g., nylon, teflon, and so on). In this embodiment, valve 5 approaches seat 6 at a non-zero angle which is approximately 10° to 25°. In the FIG. 1 embodiment, on the other hand, valve seat 6 and seal 8 engage with one another at parallel surfaces.

Also in FIG. 3, the deflating circuit is represented by dotted lines which end at symbol $r_d$. During deflating, the air coming from conduit 15 contact sensor 3, passes along the length of valve 5, and is finally discharged into the atmosphere at $r'_d$. As a result, fluid pressure p applied against gauge 2 and admitted by conduit 19 is reduced below the threshold due to the acceleration of the fluid caused by the contraction of the air passageway between vale 5 and seat 6, because of the geometry of chamber 9. This pressure p is not sufficient to deform the membrane of gauge 2 to bring the membrane into electric contact with circuit terminals 18.

When deflating is interrupted, the pressure in the apparatus is the same as the pressure in the tire, and there is no air circulation. This tire pressure P, which is greater than the threshold pressure, deforms the membrane of gauge 2 to close the electric circuit between circuit terminals 18. As a result of the circuit being closed, the tire pressure magnitude is indicated on the indicating means.

It should be noted that in FIG. 3, chamber 9 has a downward frusto-conical shape, with the opening angle of cone 5 being approximately 47°. Cone valve 5 has an angle of about 40° in this embodiment, and the bottom of chamber 9 diverges relative to the surface of cone valve 5. In other words, the sloped bottom walls of chamber 9 are not parallel with the surface of cone 5. This divergence by non-parallelism creates a Venturi effect on the air which passes through chamber 9. This arrangement improves the air flow and provides adequate reduction of the fluid pressure at the level of gauge 2.

FIG. 4 is a view of an alternative inflating-deflating assembly in which gauge 2 and sensor 3 are decentered in relation to deflating button 4. FIG. 4 is a cross-sectional view along section B—B of FIG. 5. In FIG. 4, cone-valve 5 is shown with seal 8, while chamber 9 has a substantially cylindrical geometry.

FIG. 5 is a cross-sectional view along section C—C of the assembly of FIG. 4. To illustrate various additional details, section C—C has been taken in front of deflating button 4.

From the foregoing description, one skilled in the art can easily ascertain the essential characteristics of this invention and, without departing from the spirit and scope thereof, can make various changes and modifications of the invention to adapt it to various usages and conditions.

What is claimed:

1. An apparatus for closing an electrical circuit in response to conditions in a fluid circuit wherein said apparatus comprises:
   (a) an electrical circuit for actuating a sensor for measuring the pressure of said fluid in said fluid circuit when said electrical circuit is closed;
   (b) means positioned in said fluid circuit for closing said electrical circuit when the pressure of said fluid in said circuit to be measured is at least as great as a predetermined threshold pressure and when the pressure of said fluid in said circuit is substantially stable; and
   (c) means for lowering the pressure of said fluid in contact with said means in said fluid circuit below said predetermined threshold pressure when said fluid pressure in said fluid circuit is substantially unstable.

2. The apparatus as recited in claim 1 wherein said fluid is a gas.

3. The apparatus as recited in claim 2 wherein said gas is air.

4. The apparatus as recited in claim 1 wherein said means for closing said electrical circuit comprises a deformable gauge member in contact with said fluid in said fluid circuit for closing said electrical circuit when the pressure of said fluid in said fluid circuit is at least as great as said predetermined threshold pressure.

5. The apparatus as recited in claim 4 wherein said deformable gauge member comprises a deformable membrane.

6. The apparatus as recited in claim 4 in combination with said sensor, wherein said sensor comprises a bridge pressure sensor.

7. The apparatus as recited in claim 4 wherein said deformable gauge member comprises a blister-interrupter gauge.

8. The apparatus as recited in claim 4 wherein said deformable gauge member comprises a deformable rubber membrane.

9. The apparatus as recited in claim 8 wherein said deformable rubber membrane is adapted to close said electrical circuit in response to fluid pressure in said fluid circuit in a range of up to 14 bars.

10. The apparatus as recited in claim 4 wherein said predetermined threshold pressure is approximately 0.2 to 0.3 bar relative to the ambient pressure.

11. The apparatus as recited in claim 4 wherein said means for lowering the pressure of said fluid comprises a venturi valve member positioned in said fluid circuit.

12. The apparatus as recited in claim 4 wherein said fluid circuit comprises spaced apart walls between which said fluid flows and a chamber between said walls in said fluid circuit, wherein said means for lowering the pressure of said fluid comprises a conical member disposed is said chamber of said fluid circuit between said walls to form a passageway between said walls and said conical member, such that said passageway has a reduced area as compared to the rest of said fluid circuit.

13. The apparatus as recited in claim 12 wherein said conical member comprises a revolution cone.

14. The apparatus as recited in claim 12 wherein said chamber comprises said reduced passageway, wherein said reduced passageway is located annularly around said conical member.

15. The apparatus as recited in claim 12 wherein said fluid circuit is positioned in an environment wherein said conical member comprises a valve means for controlling the passage of said fluid from said fluid circuit to said environment.

16. The apparatus as recited in claim 4 in combination with inflating means for inflating a pneumatic device with fluid flowing through said fluid circuit when said pneumatic device is connected to said fluid circuit, and wherein said inflating means is positioned in said fluid circuit so as to be in fluidic communication with said deformable gauge member.

17. The apparatus as recited in claim 16 wherein said deformable gauge member comprises means for closing said electrical circuit while said inflating means is inflating said pneumatic device.

18. The apparatus as recited in claim 4 in combination with said fluid circuit.

19. The apparatus as recited in claim 4 in combination with deflating means for deflating a pneumatic device by draining the fluid in said pneumatic device through said fluid circuit to an environment outside said fluid circuit when said pneumatic device is connected to said fluid circuit, wherein said deflating means is positioned in said fluid circuit.

20. The apparatus as recited in claim 19 wherein said deformable gauge member comprises means for closing said electrical circuit while said deflating means is deflating said pneumatic device.

21. The apparatus as recited in claim 4 in combination with said fluid circuit, wherein said fluid circuit comprises:
  (i) means for fluidically connecting said fluid circuit to a pneumatic device filled with said fluid; and
  (ii) means for deflating said pneumatic device, wherein said deflating means comprises:
    a chamber connected to said connecting means wherein said chamber comprises a wall positioned between said chamber and an environment outside said fluid circuit; and
    a valve positioned in said chamber and adapted to move between open and closed positions, wherein in said open position, said valve is spaced from said wall so as to permit fluidic communication between said chamber, said pneumatic device and said environment, and wherein in said closed position said valve contacts said wall so as to prevent fluidic communication between said chamber and said environment.

22. The apparatus as recited in claim 21 wherein said chamber comprises lateral walls and a first end in communication with said connecting means and a second end in communication with said valve, wherein said valve is in the shape of a cone having a tapered portion which decreases in width in the direction of said first end of said chamber, wherein the distance between said valve and said lateral walls is less than the diameter of said connecting means.

23. The apparatus as recited in claim 21 wherein said fluid circuit further comprises a valve seat in said chamber for seating said valve, wherein said valve comprises a cone-shaped member having an conical angle alpha between 40 degrees and 60 degrees.

24. The apparatus as recited in claim 23 wherein said valve seat comprises a first portion and a second portion, wherein said first portion has a width defined by angular slope x between approximately 40 and 75 degrees and said second portion has a width defined by an angular slope y between approximately 100 to 140 degrees.

25. The apparatus as recited in claim 21 wherein said fluid circuit further comprises:
  (iii) means for inflating said pneumatic device with fluid flowing through said fluid circuit;
  (iv) a first passageway fluidically connecting said inflating means with said connecting means;
  (v) a second passageway fluidically connecting said deflating means with said first passageway.

26. The apparatus as recited in claim 25 wherein said inflating means comprises:
  (i) an inflating conduit, connected to a source of fluid under pressure; and
  (ii) an inflating valve, positioned between said inflating conduit and said first passageway, wherein said inflating valve is adapted to move between an open position in which said valve blocks fluidic communication between said inflating conduit and said first passageway and a closed position in which said valve permits fluidic communication between said inflating conduit and said first passageway, wherein said fluid circuit further comprises sealing means for preventing fluidic communication between said first and second passageways when said inflating valve is in its open position and said sealing means permits fluidic communication between said first and second passageways when said inflating valve is in its closed position.

27. The apparatus as recited in claim 1 in combination with inflating means connected to said fluid circuit for inflating a pneumatic device with fluid flowing through said fluid circuit when said pneumatic device is connected to said fluid circuit.

28. The apparatus as recited in claim 27 in combination with said fluid circuit, wherein said fluid circuit further comprises first and second fluid passageways connecting said closing means with said inflating means so that said inflating means is fluidically connected to said closing means by said first and second fluid passageways, wherein said fluid circuit further comprises a movable seal for selectively blocking fluid communication between said first and second fluid passageways.

29. The apparatus as recited in claim 28 wherein said first and second fluid passageways each comprise a conduit.

30. The apparatus as recited in claim 1 wherein said closing means comprises a purely mechanical device.

* * * * *